Figure 1:
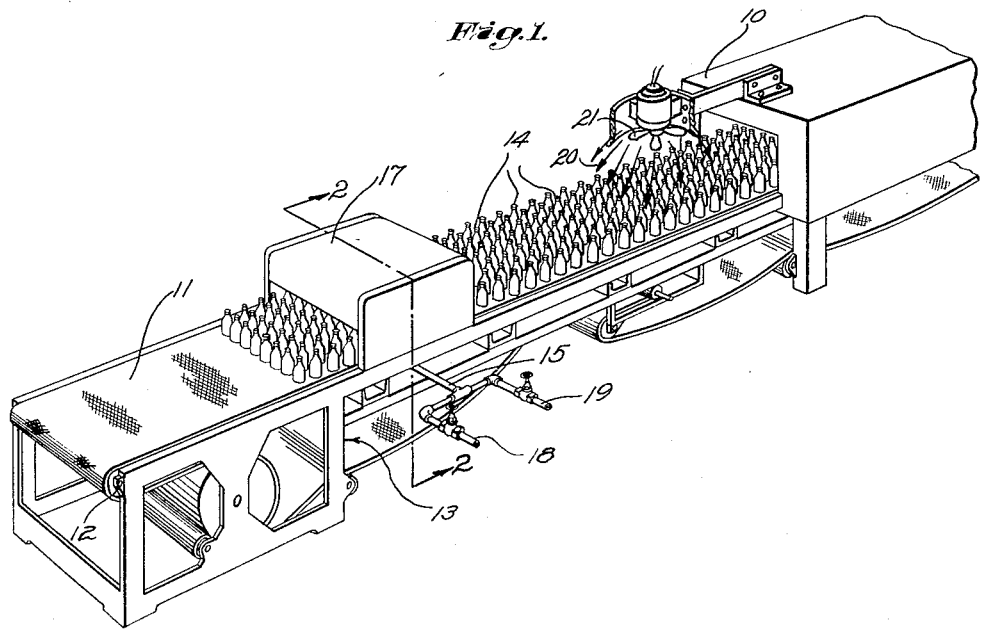

Jan. 23, 1951     K. E. PEILER     2,539,159
METHOD OF TREATING ANNEALED GLASSWARE
BEFORE COMPLETE COOLING THEREOF
Filed Feb. 26, 1944

Witness

Inventor
Karl E. Peiler
By Brown & Parham
Attorneys

Patented Jan. 23, 1951

2,539,159

UNITED STATES PATENT OFFICE 2,539,159

METHOD OF TREATING ANNEALED GLASSWARE BEFORE COMPLETE COOLING THEREOF

Karl E. Peiler, West Hartford, Conn., assignor to Hartford-Empire Company, Hartford, Conn., a corporation of Delaware Application February 26, 1944, Serial No. 524,000

4 Claims. (Cl. 49—89)

This invention relates broadly to the art of treating newly-manufactured glassware to render such glassware suitable, when completely cool, for the use intended. Without a suitable heat treatment after it has been removed from a forming machine by which it was produced, an article of glassware, such as a bottle, jar, or other container, would be harmfully strained so that it would be likely to break spontaneously or would not have the requisite strength for the service intended.

One form of heat treatment, known as annealing, is commonly used for the treatment of newly-made glassware. Annealing of glassware ordinarily is effected by the use of lehrs. While lehrs may vary considerably among themselves in details of construction, modes of operation, etc., the conventional lehr of commerce may be said to comprise a long open-ended structure, known as a tunnel, a conveyor onto which the articles of glassware to be annealed are loaded and by which such articles are carried through the lehr tunnel and suitable means for effecting controlled heating and cooling of the glassware during the passage of such glassware through the tunnel. The conveyor of the conventional lehr extends beyond the rear or exit end of the tunnel for a substantial distance, for example, for approximately one-fourth of the length of the complete lehr before passing over a suitable supporting and guiding roller or like element for reversing the direction of movement of such conveyor. The structure beyond the rear or exit end of the lehr tunnel over which the rearwardly extending end portion of the active or ware-carrying stretch of the conveyor passes and by which it may be supported frequently is termed a "packing table."

The handling of the articles of glassware in order to remove them from the delivery end portion of the conveyor at the packing table, whether for inspection or packing or both, is attended by considerable knocking together of adjacent glass articles. This is more or less unavoidable under usual service conditions. It has been ascertained that if two such articles are in collision with each other or have been rubbed together at their side surfaces, even gently, such articles will have a strength reduced substantially below that of like articles which were kept out of contact with one another when they were handled for inspection or packing. Investigation has revealed that when the glass articles are knocked or rubbed together during handling as they are removed from the delivery end portion of the lehr conveyor, minute cracks, fissures or cuts are produced in the walls of the articles at the places of contact. These may be temporarily visible to the naked eye but whether visible or not, they remain in the walls of the articles that have been in collision and serve to reduce the strength thereof to a substantial extent.

An important object of the present invention is to obviate or substantially reduce the harmful effect of surface cracks, fissures or abrasions such as those above referred to as being formed in articles of glassware that have been knocked or rubbed together during removal from the lehr conveyor for inspection, packing or other disposition.

I have discovered that the thermal difference between the outer and inner surfaces of an article of glassware at the time it is removed from the lehr conveyor, the outer surface being colder, and the temporary strain in the wall of the article resulting from such thermal difference are of substantial consequence in causing the objectionable cracks, fissures and abrasions in the outer surface portion of such an article when it collides with or is rubbed against another. Specifically, the thermal difference and resultant temporary strain will create a condition of sufficient tension at the outer colder surface of the glass article to cause any incipient crack, fissure or abrasion produced by the contact of the article with another to open up and be extended or enlarged and to persist in the article when it has completely cooled. This causes the objectionable reduction of strength of the scratched or abraded article. It had not been recognized prior to my discovery that the heat remaining in the wall of an annealed glass article at the time of its removal from the lehr conveyor or any temporary strain therein because of the outside of the wall of the article being cooler than the inside was of any consequence, assuming, of course that the article was not too hot to be handled without discomfort. Limitations of time and space make handling of the annealed glassware while it has some heat in it practically necessary under most operating conditions.

A further object of the invention is to provide a practical method of treating annealed glassware before such glassware has cooled completely to room temperature and before it has been handled for inspection or packing so as to obviate any harmful temporary strain in the glassware at the time it is to be handled and especially to prevent tension at the outer surface of the glassware at that time.

Figure 2:
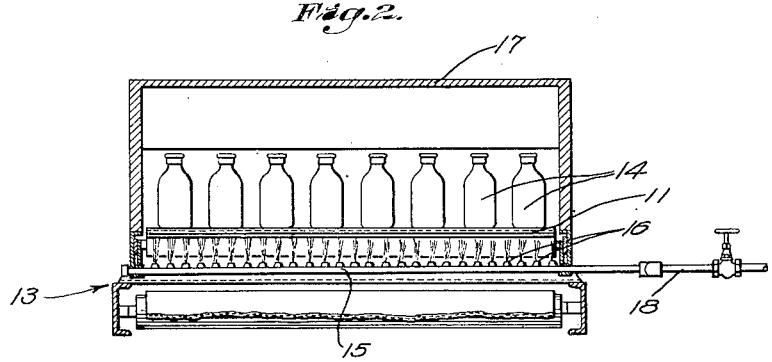

I may attain the foregoing and other objects of the invention by subjecting the articles of glassware after they have passed from the lehr tunnel and while they still retain some heat in their walls to a brief temperature regulating treatment. This will reverse the temperature relationship of the inner and outer surface portions of the articles so as to cause temporary compressive stresses in said outer surface portions or will put these surfaces into approximate thermal balance so as to obviate any condition of tension in the outer surface layers of the glass articles. Temporary compressive strains in such outer layers will not be harmful and, indeed, will tend to be beneficial. I may carry the present invention into effect by subjecting the outer surfaces of annealed incompletely cool glass articles briefly to a heating influence, as from jets of flame. I prefer, as a matter of convenience, to apply a heating influence to the external surfaces of the articles of glassware while they are on the delivery end portion of the conveyor of a lehr beyond the exit end of the tunnel of such lehr and just before they have been brought by the travel of the lehr conveyor to the place at which they will be grasped and removed from the conveyor. One means for and one way of doing this in accordance with the invention are illustrated in the accompanying drawings, in which:

Figure 1 is a perspective view of the rear end portion of a conventional annealing lehr, showing the exit portion of the lehr tunnel and the delivery end portion of the lehr conveyor, together with a simple mechanism for applying jets of flame to the articles of glassware on the lehr conveyor; and Fig. 2 is a transverse section through the delivery end portion of the lehr conveyor and through the associate structure shown in Fig. 1 for applying heat to the articles of glassware on such conveyor, the view being taken along the line 2—2 of Fig. 1.

In Fig. 1, the tunnel of a conventional lehr is indicated at 10. A lehr conveyor 11 extends from the exit end of this lehr tunnel. The delivery end portion of this conveyor passes around a supporting and direction reversing horizontal roller or drum 12 which is located at a substantial distance from the exit end of the lehr tunnel. This delivery end portion of the conveyor is supported in the open air and is guided by a structure generally designated 13. Articles of glassware, specifically bottles 14, are shown in closely spaced relation upon the conveyor, being arranged in both transversely and longitudinally extending rows thereon.

It will be understood that articles of glassware on the lehr conveyor will be subjected to suitable temperature controlling and regulating influences during their passage through the lehr tunnel so that each such article has a temperature well below the strain point of the glass thereof at the time such article is carried by the lehr conveyor from the exit end of the lehr tunnel. This temperature may be in the order of several hundred degrees. The ware cools in the open air during its further travel so that, while there will still be some heat in the wall thereof, each article should be cool enough to be grasped and removed by hand before it reaches the end of the upper or ware-carrying stretch of the conveyor. As hereinbefore pointed out, such article, when removed, would be cooler externally than internally.

According to the present invention, a transversely extending burner tube or manifold 15 may be placed beneath the ware-supporting stretch of the lehr conveyor at a predetermined place between the exit end of the lehr tunnel and the extreme outer end of that stretch. The burner tube or manifold 15 may be closed at its free end and provided at its upper side with a series of upwardly turned nozzles or discharge outlets 16, Fig. 2, for projecting jets of flame upwardly through the conveyor 11, which suitably is of foraminous or openwork structure, against the bottoms and upwardly in enveloping relation to the bottles 14 on the overhead portion of this conveyor.

The location of the tube or manifold 15 suitably is such that the bottles on the moving conveyor will be down to near room temperature at their outer surfaces, as, for example, to within 20° to 50° F. thereabove, and in any event will be cool enough so that such bottles may be heated locally at their outer surfaces by the jets of flame from the burner nozzles or outlets 16 to the extent desired and still be cool enough for safe handling promptly after this treatment. If, in a particular installation, the bottles otherwise would not be sufficiently cool by the time they are brought by their conveying means into the zone of treatment by the heating means, intensified cooling of such bottles before the heat treatment may be resorted to. This may be done by the use of a suitable blower fan or other known cooling air discharge means, as by air blasts as indicated by the arrows 20 from an overhead blower fan 21, Fig. 1.

The heating effect of the jets of flame will raise the heat content of the outer surface layers of the articles of glassware sufficiently to prevent tension in these outer surface layers and preferably to cause temporary compressive strains therein. The heat added however need not be sufficient to interfere materially with the usual operations of inspecting and handling the articles of glassware. A hood or cover structure 17 may be placed on the conveyor supporting structure 13 in position to span the conveyor so as to confine more or less heat from the burner nozzles or outlets 16 in the space containing several of the transverse rows of bottles. As shown, the burner tube or manifold 15 is provided with valved fuel and air supply pipes 18 and 19, respectively, so that the volume and intensity of the jets of flame from the nozzles may be regulated to provide the desired heating action at any given time. The arrangement may be such that the jets of flame will be on continuously, the conveyor moving the bottles into and from the zones of heat from these jets suitably to assure adequate heating and to avoid overheating thereof. If desired or if conditions require, any suitable known means (none shown) may be provided to vary the heating effect of the burners automatically at intervals or to otherwise control the operation of the heating means in a known manner in order to assure proper heating of the bottles.

Any handling of the bottles, which will involve rubbing or knocking two or more of them together before they have completely cooled, as in inspecting them, should be done soon after they have been given thermally corrective treatment, as by the means and in the manner above described, so as to take advantage of the corrected stress condition. If such handling is delayed too long, there is danger that differential cooling of their inner and outer surfaces may destroy the favorable stress condition and cause tensile stresses to again be set up at their outer surfaces. The bottles therefore should be inspected promptly after they emerge from the hood or cover structure 17 as the stresses on their surfaces will then be compressive or at least not tensile. They then may be grasped and removed in the usual way, several articles possibly being grasped in the same hand at one time. Since their outer surfaces are free from tension, such knocking or rubbing together of these surfaces as is likely to take place during reasonably careful handling will not substantially impair the strength of the articles. Temporary compressive stresses at the outer surfaces of the articles when they are knocked or rubbed together will aid prevention and reduction of any incipient cuts and abrasions resulting from the collision of such articles.

If the thermal treatment renders the bottles too hot to handle for inspection, then they must be cooled to a lower temperature before undergoing the heating treatment. In other words, such cooling must be sufficient to permit the bottles to receive the heating treatment and still be cool enough to be picked up for inspection.

I do not wish to be limited to the details of the illustrative embodiment of the invention shown in the accompanying drawings and particularly described herein, for obvious modifications will occur to those skilled in the art.

What I claim is:

1. The method of treating newly-made hollow glass articles, such as bottles and jars, which comprises passing such glass articles through a lehr tunnel and heat treating them during their passage through such tunnel so that, on emerging from the exit end of the lehr tunnel, they have a temperature well below the strain point of the glass thereof but above room temperature and their outer surfaces are cooler than their inner surfaces, conveying said articles from the exit end of the lehr tunnel for a substantial distance to permit further cooling thereof and to present them in positions to be grasped and inspected or packed when they are cool enough for manual handling, and, while such articles are being conveyed beyond the exit end of the lehr tunnel and are still above room temperature with their outer surfaces cooler than their inner surfaces and before handling thereof, applying a temperature regulating medium to such articles to alter said temperature relationship between their inner and outer surfaces until their outer surfaces are at a temperature at least as high as that of their inner surfaces.

2. The method defined by claim 1 wherein said temperature regulating medium applied to said glass articles reverses the temperature relationship between their inner and outer surfaces so as to cause temporary compressive stresses on their outer surfaces.

3. The method of treating newly-made hollow glass articles, such as bottles and jars, which comprises passing such glass articles through a lehr tunnel and heat treating them during their passage through such tunnel so that, on emerging from the exit end of the lehr tunnel, they have a temperature well below the strain point of the glass thereof but above room temperature and their outer surfaces are cooler than their inner surfaces, conveying said articles from the exit end of the lehr tunnel for a substantial distance to permit further cooling thereof and to present them in positions to be grasped and inspected or packed when they are cool enough for manual handling, and, while such articles are being conveyed beyond the exit end of the lehr tunnel and are still above room temperature with their outer surfaces cooler than their inner surfaces and before handling thereof, applying a heating medium to the outer surfaces of said articles to heat them individually to a temperature at least as high as their inner surfaces so as to prevent temporary tensile stress on their outer surfaces.

4. The method defined by claim 3 wherein the heating of the outer surfaces of said glass articles reversed the temperature relationship between the inner and outer surfaces of the individual articles so as to cause temporary compressive stresses on the outer surfaces of said articles.

KARL E. PEILER.

REFERENCES CITED

The following references are of record in the file of this patent:

UNITED STATES PATENTS

| Number | Name | Date |
| --- | --- | --- |
| 48,761 | Bennett | July 11, 1865 |
| 1,132,459 | Denning | Mar. 16, 1915 |
| 1,540,264 | Henry | June 2, 1925 |
| 1,795,819 | Axell | Mar. 10, 1931 |
| 1,903,281 | Bowman | Apr. 4, 1933 |
| 1,908,303 | Beatty | May 9, 1933 |
| 2,073,144 | Darrah | Mar. 9, 1937 |
| 2,268,609 | Merrill | Jan. 6, 1942 |
| 2,285,595 | Littleton et al. | June 9, 1942 |
| 2,243,149 | Despret | May 27, 1941 |
| 2,321,152 | Mengle | June 8, 1943 |
| 2,344,630 | Mylchreest | Mar. 21, 1944 |